Figure 1:
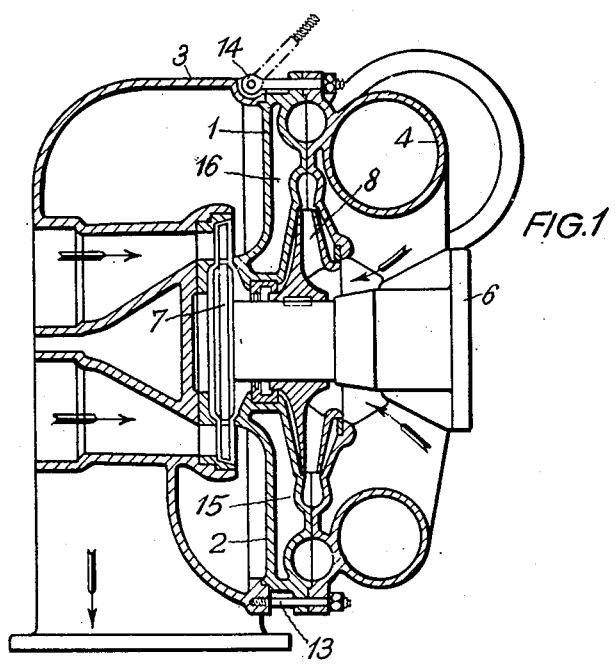

Nov. 1, 1949          A. BÜCHI          2,486,731

GAS TURBINE-DRIVEN BLOWER

Filed April 25, 1947          5 Sheets-Sheet 1

INVENTOR:

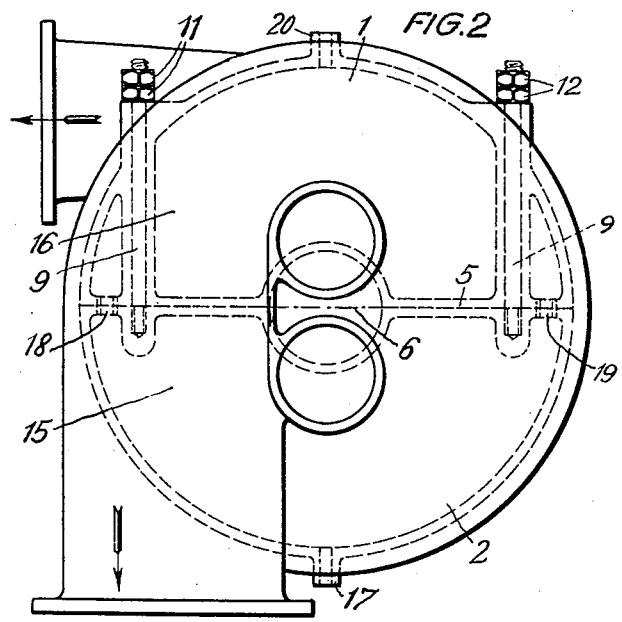
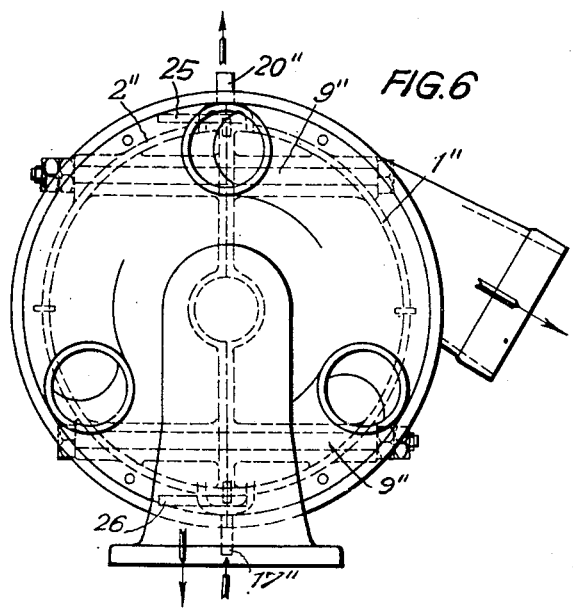

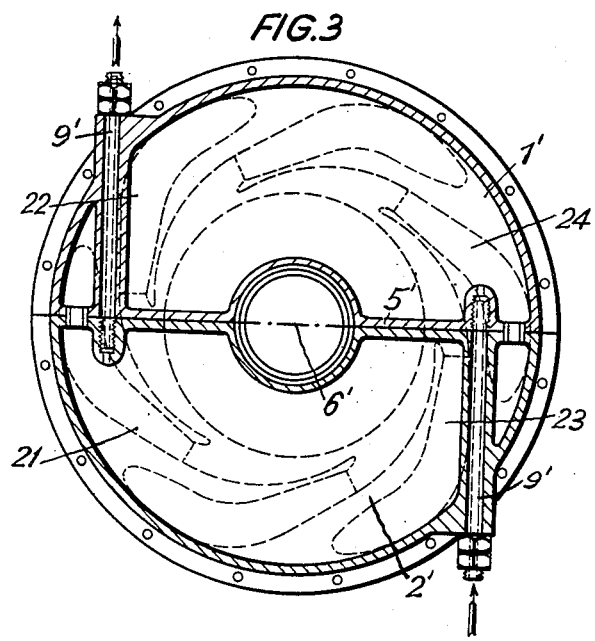
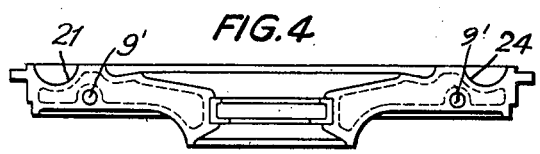
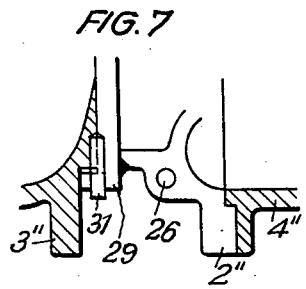
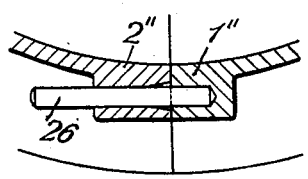

INVENTOR:

Nov. 1, 1949 A. BÜCHI 2,486,731
GAS TURBINE-DRIVEN BLOWER
Filed April 25, 1947 5 Sheets-Sheet 5

INVENTOR:

Patented Nov. 1, 1949

2,486,731

UNITED STATES PATENT OFFICE 2,486,731

GAS TURBINE-DRIVEN BLOWER

Alfred Büchi, Winterthur, Switzerland

Application April 25, 1947, Serial No. 744,015
In Switzerland May 7, 1946

11 Claims. (Cl. 230—116)

My present invention relates to improvements in blowers driven by gas turbines, and in particular to the structural design of the junction members intermediate of turbine and blower, which for reasons of assembly are made in at least two portions, the plane or planes of junction passing through the axis of the turboblower.

One object of my invention is to make the said junction members detachable and disconnectible by providing at least two main interconnecting means (studs, bolts and the like) disposed at right angles to the plane of junction.

Another object is to protect the said interconnecting means from the action of the turbine pressure-fluidum by passing same through and disposing same in the said junction members.

A further object is to design such construction to allow inserting and withdrawing the said interconnecting means entirely from the outside, without the necessity of demounting the component parts and portions proper of the turbine and the blower-case. In case of only two such interconnecting means, the latter may pass substantially through the center of gravity of the two junction faces disposed on either side of the turbine axis. In case of blowers having diffusor portions spaced comparatively far apart, the said interconnecting means may be disposed in the bays between the diffusors in order to reduce the width of the said junction members.

A still further object is to adapt the said junction members so as to permit of dismantling same without the necessity of demounting the blower- and the turbine-case or their intake and outlet elements, for the purpose of gaining access to the impellers of the turboblower.

Another object is to provide mating guide means in the machine parts to be assembled, in order to permit of accurately introducing and withdrawing the said junction members.

Another object is to afford means which permit of making that wall portion of the said members which faces the hot turbine of a material which is of a more heat-resistant character than the portions facing the cold blower.

A further object is to suitably form the said junction members with a view of affording a good cooling thereof by means of a cooling fluidum. Provision has to be made in such connection for keeping those portions of the said members which face the blower, as cool as possible. The main interconnecting means also may be adapted for supplying and/or delivering the cooling fluidum by using hollow tube-type studs, bolts, etc. as the main interconnecting means. The junction members also may be adapted for receiving insulating material. In such latter case, the means interconnecting the two junction-member faces shall be designed with a minimum cross-section so as to decrease the heat-convection from the turbine to the blower-face.

Aside of the said main interconnecting means for holding together the junction members, auxiliary connecting means yet may be provided on the outer circumference of the said members or of the turbine- and/or blower-case, by means of which the blower-case is held axially together with the detachable said members and/or the turbine case. the said means may be adapted detachable or pivotable so as to permit of introducing or withdrawing the said members into or from the fully assembled turbine- and/or blower-case.

Figure 5:
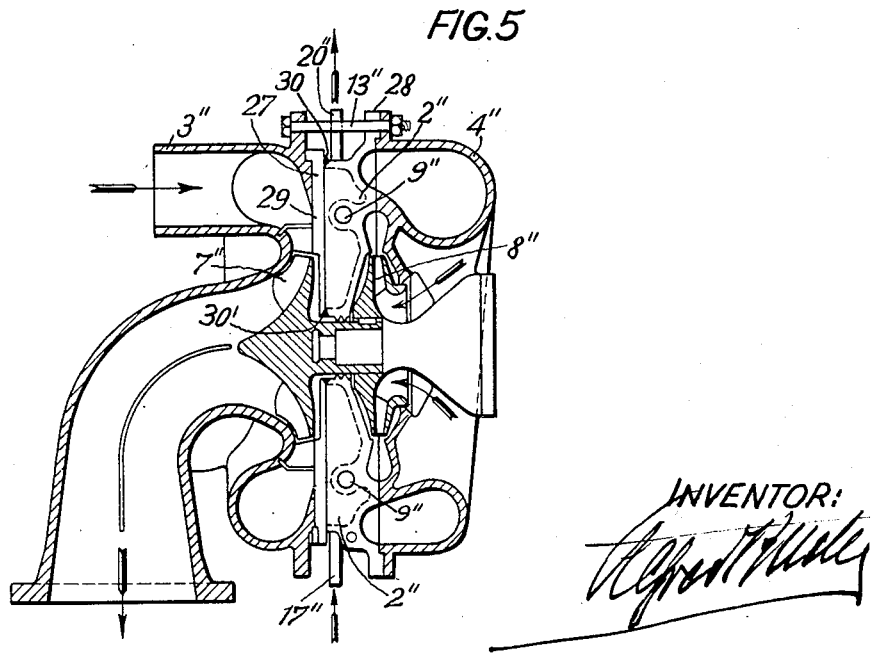
Figure 9:
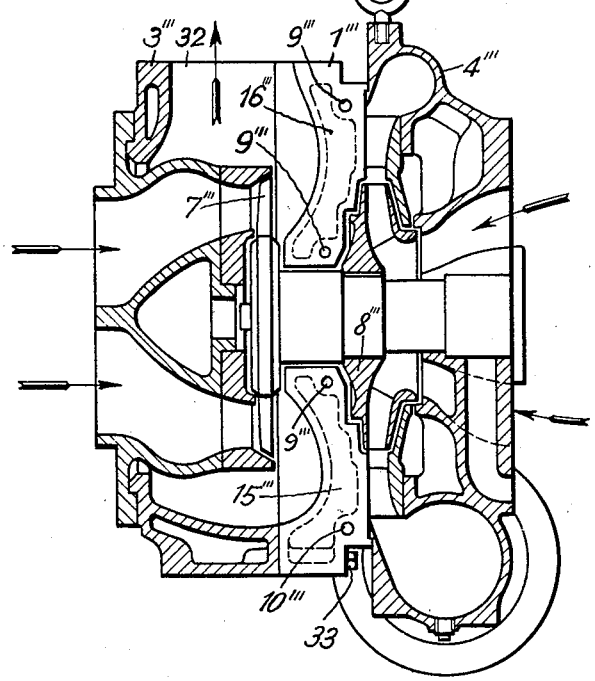
Figure 11:
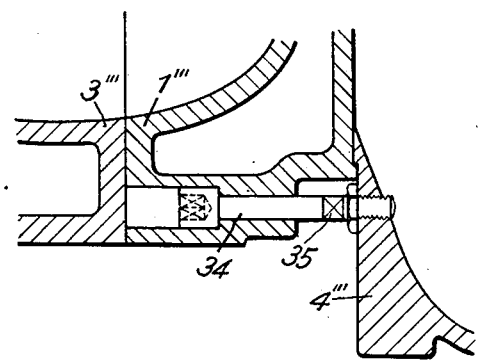
Figure 10:
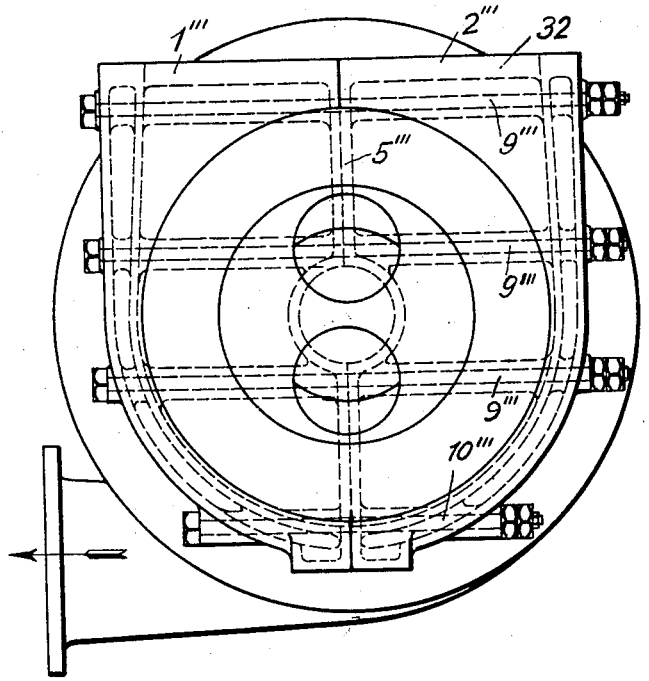
Figure 12:
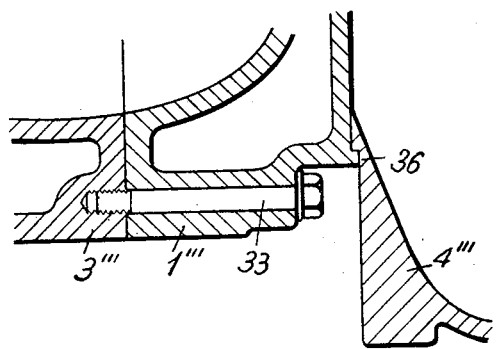

Various forms of invention pertaining to gas turbine-driven blowers are illustrated, by way of example, in the accompanying drawings in which Figs. 1 and 2 show a first example in axial section and front or axial elevation respectively, the turbine being of the axial type, Figs. 3 and 4 a radial or cross-section and a side view respectively of a second example, Figs. 5 and 6 an axial section and front or axial elevation respectively of a third example, the turbine being of the radial type, Figs. 7 and 8 details of the design according to Figs. 5 and 6, Figs. 9 and 10, also in axial section and front elevation respectively, an application in an axial-type turbine and in another blower design, and Figs. 11 and 12 details of means for connecting the inventive junction members shown in Figs. 9 and 10 to the turbine- and blower-case respectively.

The invention specifically relates to the structural design of the junction members 1 and 2, which however, also may be more than two in number.

In Figs. 1 and 2, the said members 1 and 2 are mounted between the gas turbine-case 3 and the blower-case 4, on either side of a horizontal plane of junction 5 which passes through the turbine axis 6. The impeller of a single-stage axial turbine, e. g., is denoted by 7, and that of a single-stage centrifugal blower, e. g., by 8.

The two parts 1 and 2 are interconnected by holding-down means (studs) 9 which are secured to part 2 and project through the inside of part 1. The said means 9, are engaged and secured at their free outside ends by nuts and check nuts 11 and 12 respectively. Means 9 are so located inside the said parts 1, 2 as to dispose same on either side of the turbine axis substantially in the center of gravity of the plane of junction 5. The said means thus exert a substantially equal sealing pressure upon the junction 5. To interconnect the cases 3 and 4 and to secure the members 1 and 2 between same, auxiliary or axial holding-down means 13 yet are provided for. Instead of the latter threaded pins, as shown at 14 in Fig. 1 may be pivotably secured to the turbine-case 3.

The junction members are provided with hollow spaces 15 and 16 for a cooling fluidum. The latter enters at 17 into space 15, and is discharged through the openings 18 and 19, sealed to the outside, into the upper cooling space 16. The cooling fluidum flows out of the latter at 20.

In Figs. 3 and 4, the hold-down studs 9' are staggered with respect to the plane of junction 5'. Each of the said studs is disposed between two diffusor ducts 21, 22 and 23, 24 respectively, of a blower-discharge arrangement comprising six diffusor ducts. The width or depth of the abut-junction members in the axial direction, therefore, is reduced, as may readily be seen from the side elevation thereof shown in Fig. 4. As shown in Fig. 3 the hold-down studs 9' may be hollow or tubular and thereby form conduits for passage of cooling fluidum into and out of the cooling spaces in the direction of the arrows.

Figs. 5 and 6 show the application of the invention in a turbine-impeller 7'' of the radial type charged by means of three gas inlets. The detachable and disconnectible junction members 1'' and 2'' are held together by the bolts 9'', which are disposed at right angles to the axis of the turboblower. Upon assembly, the members 1'' and 2'' are guided and properly fitted relative to each other by means of guiding pins 25 and 26. The outer flanges 27 and 28 of the members 1'', 2'' are adapted as lugs to assure the proper assembly of all the parts 1''—4''. The members 1'' and 2'', therefore, may be laterally removed from the turboblower after slacking their connections with the turbine- and the blower-case. and the connections of the latter inter se. Turbine-case 3'' is held axially together with members 1'' and 2'' and blower-case 4'', by means of demountable bolts 13''.

The members 1'' and 2'' may be provided, on the turbine side. with partitions 29 made of a more heat-resisting material than the remaining portion thereof. The partitions 29 may be connected to the members 1'' and 2'' by welding, brazing or in any other suitable manner, e. g. at 30 and 30' respectively.

In the example according to Figs. 5 and 6, as in that shown in Figs. 1 and 2, 17'' denotes an inlet and 20'' an outlet for a cooling fluidum. The hollow spaces in the junction members, however, also could be filled with a heat-insulating material.

The specific adaptation of turbine case 3'' with member 2'' and blower case 4'' at their juncture is shown in Fig. 7 which illustrates a portion of Fig. 5 in larger scale. Here again, 29 is the partition wall fastly secured to member 2''. For the purpose of centering the non-cooled and thus expanding turbine case 3'', cotters 31 are provided between the latter and the members 1'' and 2''. In order to maintain such centering at any temperature difference, cotters 31 must be disposed radial, and at least three of same must be provided for.

Fig. 8 shows the disposition of the guiding pin 26 in the members 1'' and 2''.

In the example according to Figs. 9 and 10, the members 1''' and 2''' are of a design different from that in the previous examples, and also the juncture between the members 1''', 2''' and the turbine-case 3''' and case 4''' is provided with a cooling arrangement. The juncture is brought up closer to the turbine. The discharge opening 32 of the turbine comprises part of the members 1''' and 2'''. Further, a special axial connection of members 1''', 2''' and turbine case 3''' is provided by the studs and nuts 33, (Fig. 12), and specially adapted socket-headed studs 34 (Fig. 11) connect members 1''', 2''' in axial direction with blower-case 4'''. The plane of juncture of members 1''' and 2''' passes through the turbine discharge-opening 32. Members 1''', 2''' are interconnected by means of four detachable transverse bolts 9''' and 10''' which may be manipulated from the outside. The position of the bolts relative to the plane of juncture 5''' is so chosen as to afford an abutment reaction as uniform as possible and thus a good seal between members 1''' and 2'''. The disposition of the bolts also should be such, as may be seen from Fig. 9 as to maintain the efficiency of the cooling faces in members 1''' and 2''' at their most important points, e. g. adjacent the hot turbine-discharge duct. The said bolts also may be machined for a close fit.

The studs 34, as shown in Fig. 11, also may be provided with a square portion 35 close to their threaded portion, which latter is secured in blower-case 4''', to permit of slacking same without the necessity of demounting turbine case 3'''. The length of studs 34 then must be such as to permit of accommodating same, when detached entirely inside the peripheral axial width of members 1''' and 2'''.

Fig. 12 shows a section yet, in larger scale, through a stud 33 which axially holds together the members 1''', 2''' and the turbine case 3'''. Since the junction members 1''', 2''' and also the turbine case are cooled, the centering also may be accomplished by means of studs 33 which are machined for close fit so that the juncture between turbine case and junction members at right angles to the axis may remain a plane surface.

The junction members 1''', 2''' advantageously are provided with a peripheral curb or shoulder 36 (Fig. 12) which is engaged by a corresponding abutment shoulder disposed on blower case 4'''. Such arrangement permits of laterally removing the junction members 1''' and 2''', after slacking all the fastening means 9''', 10''', 33 and 34 without the necessity of demounting the impellers 7''', 8''' and the suction and discharge connections. In this case also, the length of studs 33 must be less than the peripheral width of the junction members 1''' and 2'''.

My present invention, of course, also may be applied to gas turbine-driven blowers of other designs, e. g. blowers having at least one outside bearing or blowers without over-hanging turbine-impeller. It, further, may be applied in multi-stage turbines and/or multi-stage blowers, e. g. at their juncture, and also in gas turbine-driven blowers of the axial type.

What I claim and desire to secure by Letters Patent is:

1. A gas turbine-driven blower having coaxially mounted impellers, respectively for the turbine and blower, gas turbine and blower housing cases having inlet ducts communicating therewith each enclosing at least part of an impeller, and a composite junction member comprising at least two portions mounted between said housing cases, each portion being radially removable and joining in a plane passing through the axis of the turbo blower and at least two main fastening members comprising studs, bolts or the like disposed at right angles to said plane for interconnecting said portions.

2. A gas turbine-driven blower having coaxially mounted impellers, respectively for the turbine and blower, gas turbine and blower housing cases having inlet ducts communicating therewith and disposed at each axial end, each enclosing at least part of an impeller, said cases extending axially towards each other to leave an annular opening therebetween, and a composite junction member comprising at least two portions mounted between said housing cases to close said annular opening, each portion being radially removable and joining in a plane passing through the axis of the turbo blower, and at least two main fastening members comprising studs, bolts or the like disposed at right angles to said plane for interconnecting said portions, whereby said portions may be removed independently for access to said impellers without dismantling the turbine or impeller housing cases.

3. In a gas turbine-driven blower of the class indicated, a composite junction structure located between the blower impeller and the turbine impeller comprising on one end one part of the diffuser ducts of the blower and on its other end one part of the turbine inlet casing, consisting of two portions, joined in one plane passing through the turbo blower axis, and at least two main fastening means comprising studs, bolts and the like for interconnecting the said portions disposed at right angles to the said plane, said fastening means being passed through the said portions and disposed in the latter in such manner as to protect them from the action of the turbine operating fluidum, and to permit of slackening them from the outside.

4. In a gas turbine-driven blower, a composite junction structure as set forth in claim 3, having only two of the said main fastening means disposed to pass substantially through the center of gravity of the two surfaces of juncture disposed on either side of the turbine axis, for the purpose of exerting a substantially uniform sealing pressure onto the said portions and upon the whole jointed surfaces.

5. In a gas turbine-driven blower, comprising diffuser ducts spaced relatively far apart, a composite junction structure as set forth in claim 3, wherein the said main fastening means are disposed between the axial depressions or hollows of said diffuser ducts for the purpose of reducing the width of the said junction portions.

6. In a gas turbine-driven blower, a composite junction structure of the character set forth in claim 3, comprising a wall plate facing the turbine and made of a metallic but more heat-resisting material than the parts facing the blower, combined by welding, soldering or brazing together with the other metallic parts of the composite structure.

7. In a gas turbine-driven blower, a composite junction structure of the character set forth in claim 3, in which the said portions are built as bodies having hollow inner spaces for the purpose of circulating a cooling fluidum therethrough.

8. In a gas turbine-driven blower, a composite junction structure of the character set forth in claim 3, in which the said main fastening means comprise hollow ducts to at least partly supply and discharge the cooling fluidum into and from the said junction portions.

9. In a gas turbine-driven blower, a composite junction structure of the character set forth in claim 3 wherein the junction portions comprise bodies with hollow inner spaces to receive an insulating material therein, and in which the metallic parts interconnecting the two side walls thereof are made of minimum cross section for the purpose of decreasing the convection of heat from the gas turbine side to the blower side.

10. In a gas turbine-driven blower, a composite junction structure of the character set forth in claim 3, comprising in addition to the said main fastening means, other means disposed on the outer circumference of the said structure and at least one of the turbine case and blower case for axially interconnecting at least one other part of the blower and turbine cases with said junction structure portions.

11. In a gas turbine-driven blower, a composite junction structure of the character set forth in claim 3, comprising in addition to the main fastening means other means disposed on the outer circumference of the said structure and of at least one other part of the turbine case and blower case for axially interconnecting at least one part of blower case and turbine case with said junction structure, said other means being removable so as to permit of independent mounting or demounting the junction structure.

ALFRED BÜCHI.

REFERENCES CITED

The following references are of record in the file of this patent:

UNITED STATES PATENTS

| Number | Name | Date |
|---|---|---|
| 1,171,926 | Carpenter | Feb. 15, 1916 |
| 1,400,323 | Sherbondy | Dec. 13, 1921 |
| 1,714,340 | Allen et al. | May 21, 1929 |
| 1,787,088 | Schleyer | Dec. 30, 1930 |
| 2,406,388 | Larrecq | Aug. 27, 1946 |

Certificate of Correction

Patent No. 2,486,731								November 1, 1949

ALFRED BÜCHI

It is hereby certified that errors appear in the printed specification of the above numbered patent requiring correction as follows:

Column 1, line 45, for the word "portions" read *portion*; column 2, line 14, for "the said" read *The said*; column 5, line 48, before "them" insert *or tightening*; and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*